March 3, 1964  E. H. TALBERT  3,123,237
AIRPLANE TRANSPORTING
Filed Jan. 12, 1962  2 Sheets-Sheet 1

INVENTOR
E. HUGHES TALBERT

March 3, 1964  E. H. TALBERT  3,123,237
AIRPLANE TRANSPORTING
Filed Jan. 12, 1962  2 Sheets-Sheet 2

INVENTOR

E. HUGHES TALBERT

BY

ATTORNEY

United States Patent Office 3,123,237
Patented Mar. 3, 1964

3,123,237
AIRPLANE TRANSPORTING
Elmer Hughes Talbert, P.O. Box 482, Georgetown, Del.
Filed Jan. 12, 1962, Ser. No. 165,749
4 Claims. (Cl. 214—331)

The present invention relates to a transporting device, which can be reduced to kit form, and which can be readily attached to the wheels and tires of a large variety of airplanes, and which will facilitate the elevation, movement and transportation of said airplanes over relatively unimproved and unpaved terrain, when combined with a towing vehicle or when said transporting device is self-powered.

Objects of the present invention are as follows:

To provide, with a combination of devices, means for quickly, firmly and easily attaching separate carrier frames to each of the wheels and tires, or sets of wheels and tires, of a variety of airplanes.

To provide, with a combination of devices means for elevating said carrier frames, the airplane wheels and tires attached thereto, and therefore the airplane also— a. When clearance under parts of said airplane, measured to the ground before this transporting device is attached, is not adequate to accommodate wheels and tires on the transporting device of the size required for the terrtain to be traversed;

b. When such clearance is not a problem.

To provide, with a combination of devices, means for final locking of each of the carrier units to the respective wheels and tires of the airplane to be transported.

To provide, with a combination of devices, means for connecting the several carrier units together, after they have been locked to the wheels and tires of the airplane to be transported, in a manner practical for transport, and also adjustable to accommodate airplanes of varying sizes and configurations.

To provide, with a combination of devices, means for transporting the airplanes, after carriers have been attached thereto, elevation has been accomplished and carriers have been inter-connected, on multiple, large, relatively low-pressure tires thereby greatly decreasing ground pressures as required to traverse the relatively unimproved and unpaved terrain.

To provide, with a combination of devices, means for steering the inter-connected carrier units, both when loaded with the airplane to be transported or when unloaded.

To provide, with a combination of devices, means for adapting the carrier units for travel when they are not being used to support loads.

To provide, with a combination of devices, means for attaching the inter-connected units, and also the individual units, to a towing vehicle or device.

To provide, with a combination of devices, means whereby the entire transporting device can be quickly and easily assembled (or disassembled) from its various components, each of which can be sufficiently light in weight as to be carried easily by one or two men, thereby in effect making it possible to reduce this entire device to kit form for shipping or when circumstances of use so warrant.

The above and other objects and attending advantages of the present invention will be apparent upon consideration of the following description when made in conjunction with the accompanying drawings wherein similar reference characters refer to similar parts throughout the several views and in which:

FIG. 1 is a side view of one rear unit of this transporting device attached to a wheel of the airplane to be transported, wherein solid lines show this unit in the elevated position and ready for transport, and wherein dash lines show this unit in position ready to begin elevation of the wheel of the airplane, and wherein the near wheels of the transporting unit are shown removed in both instances to show additional details of the transporting device;

Figure 7:
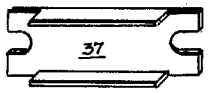
Figure 8:
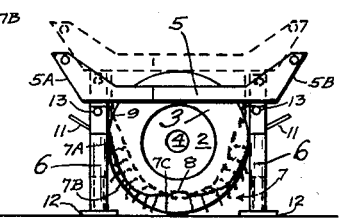
Figure 6:
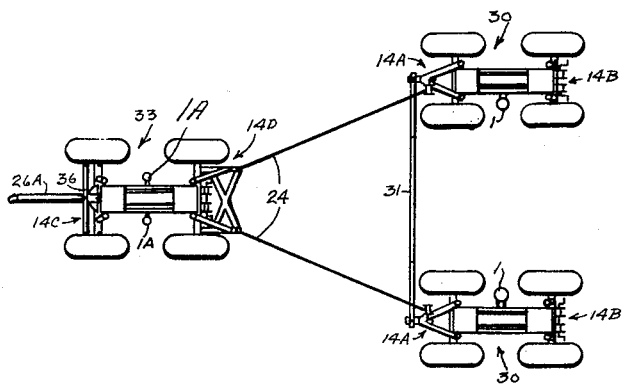
Figure 9:
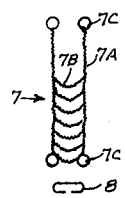

FIG. 6 is a top view of one front unit and two rear units of this transporting device with each unit being attached to the respective wheels of an airplane, and wherein all wheels of said airplane have been elevated, and wherein the three transporter units have been inter-connected with their towing cables and their rear transporter unit spacer bar, and wherein the complete transporter with its load is ready for transport by towing;

FIG. 7 is a detail drawing of the empty transport locking bar including flanges for holding flexible wheel carriers during empty transport;

FIG. 8 is a detail drawing of the carrier frame and certain other parts of the transporting device and a typical airplane wheel, wherein solid lines show the carrier frame and other parts in position for easily connecting the flexible wheel carriers, and wherein dash lines show the carrier frame elevated by the auxiliary jacks until the flexible wheel carriers have tightened in place about the airplane wheel and said wheel is ready to be elevated; and FIG. 9 is a detail drawing of one of the two units of a flexible wheel carrier, and also a typical wheel carrier connecting link.

The present invention is illustrated in these various figures as comprising an elevating and transporting system for a load in the form of an airplane with typical supporting members 1 and 1A, or for any other vehicle which may be adaptable to be elevated and transported by this system. Drawings of a typical airplane are not included, inasmuch as these are of little significance in the application of this invention, except for the airplane wheels 2 and tires 3 and 3A, which are the prime points of attachment for the use of this invention. Axles 4 and 4A are provided on the lower ends of the supporting members for journalling the wheels.

The invention is comprised of multiple transporter units arranged and inter-connected by adjustable members to conform to the dimensions and configuration of the selected load. Two or more rear units 30 are inter-connected by one or more adjustable length, transporter unit spacer bars 31 at their towing bar hitches 27 with spacer bar pins 32. These rear units 30 are then also inter-connected by means of towing cables 24 to rear towing bar hitches 27B of one or more front transporter units 33, as shown in FIG. 6.

The individual transporter units 30 and 33 consist of carrier frame assemblies 5 to which pairs of transporter strut assemblies 14A and 14B or 14C and 14D are attached by removable pins 29.

The carrier frame assemblies 5 include two separable, telescoping carrier frame members 5A and 5B, auxiliary jacks 6, flexible wheel carrier 7, flexible wheel carrier connectors 8, flexible wheel carrier length adjusters 9 and removable pins 13. The conventional hand or power-actuated hydraulic, pneumatic or screw jacks 6 are connected to the carrier frame members by removable pins 13. Conventional screw, cam or other types of adjusting elements 9 are firmly attached to the upper ends of jacks 6. The upper ends of the side elements 7A of the flexible wheel carriers 7 are in turn connected to the adjusting elements 9 in a manner to facilitate necessary, controlled, vertical travel of said flexible wheel carriers 7.

The transporter strut assemblies vary according to their position and use. All include struts 14, axles 17, wheels 15, tires 16, combination elevating stops and airplane wheel locks 18 and removable pins 29. The rear strut assembly 14B of the rear transporter unit 30 is also equipped with one or more elevating winches or winch-like devices 19 plus elevating cables 21, pulleys 20 and hooks 22.

The remaining three strut assemblies 14A, 14C and 14D all have towing bars 26, 26A and 26B, towing bar hitches 27, 27A and 27B and towing bar braces 28, although all of these members vary in the different assemblies, as shown in the various figures. The rear strut assembly 14D of the front transporter unit 33 has elevating winches 19, elevating cables 21, elevating cable pulleys 20 and hooks or other conventional fasteners 22 much like rear strut assembly 14B. The towing bar 26B of rear strut assembly 14D includes special cross braces 34.

The front strut assembly 14C of the front transporter unit 33 is always equipped with a modified automotive-type steering assembly 36, well known in the prior art, plus a locking pin 35 to hold the front wheels parallel to the rear wheels of this front transporter unit 33 while airplane wheel 2A is being elevated. The front strut assembly 14A of the rear transporter unit 30 does not normally include such steering but it is intended that front strut assemblies 14A could be so equipped if circumstances of intended use made this desirable. The front strut assembly 14A includes a towing cable 24 with hooks or fasteners 25 and a towing cable winch or winch-like device 23.

To attach and use the transporter, it will often be necessary to remove the strut assemblies from the carrier frame assemblies because obstructions, below the wings and fuselage of the airplane being attached, will interfere with the large tires 16 that will customarily be used on transporter units.

With the jacks 6 fully closed, the carrier frame assembly 5 can be adjusted for length and set on one of the airplane tires 3 or 3A, as shown by the solid lines of FIG. 8. In that position, with the wheel carrier length adjusters 9 properly set, the flexible wheel carriers 7 will have sufficient slack to permit the two wheel carrier connectors 8 to be installed easily. With the flexible wheel carriers 7 connected, extending the jacks 6 with their actuating levers 11 will first cause the wheel carriers to become tight, as shown by dash lines in FIG. 8, after which further jacking will elevate the carrier frame, airplane wheel and that part of the airplane supported upon the wheel being raised.

As soon as adequate clearance is obtained by the above actions, the proper transporter strut assemblies can be attached to the carrier frame assembly 5 with pins 29. The elevating cables 21, passing over the pulleys 20 of the rear strut assembly, can then be fastened with hooks or fasteners 22 to the front strut assembly. The elevator cables 21 can then be tightened with the winch-like devices 19 thereby continuing elevation until the wheel locks 18 of both front and rear strut assemblies are held tightly against the airplane tire 3. Locking the winch in this position completes the attaching of a transporter unit.

After the three units have been attached to the airplane wheels and properly elevated, the transporter spacer bar 31 can be adjusted to assure parallel travel of the two rear transporter units and attached to those units with pins 31. The towing cables 24 from the rear units can then be hooked to the rear towing bar 26B of the front unit, after which the winches 23 on the rear units can be used to tighten the towing cables evenly to secure parallel alignment of the front and rear transporter units, as shown in FIG. 9. Removal of the steering locking pin 35 from the front transporter unit is the final requirement before a powered vehicle (not illustrated) tows loaded transporter as desired. The removal of the airplane from the transporter is obviously almost the exact reverse of the loading process.

Figure 1:
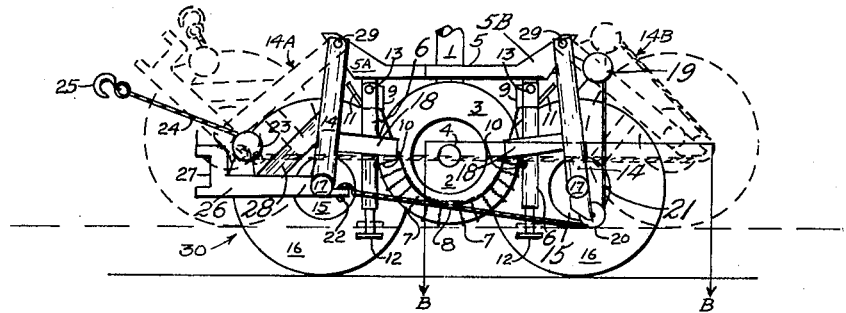
FIG. 1A is a top view through section BB from FIG. 1 showing final wheel and tire lock in position.
Figures 1A, 2:
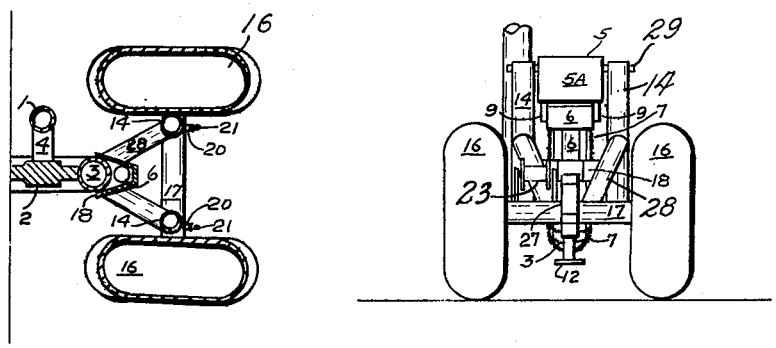
FIG. 2 is a front view of one rear unit of this transporting device attached to a wheel of the airplane to be transported, and in the elevated position and ready for transport.
Figure 3:
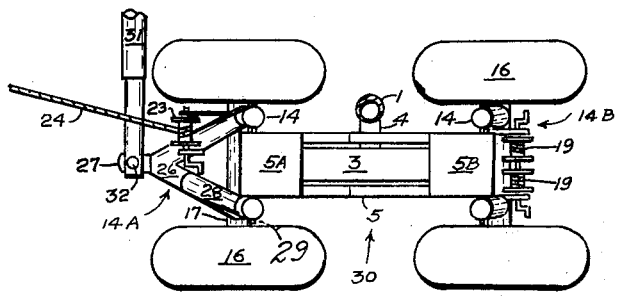
FIG. 3 is a top view of one rear unit of this transporting device attached to a wheel of the airplane to be transported, and in the elevated position and ready for transport.
Figure 3A:
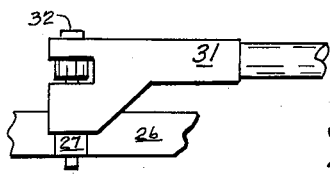
FIG. 3A is a detail drawing of the connection of the tow bar hitch of a rear transporter unit to one end of the adjustable length, rear transporter unit spacer bar.
Figure 4:
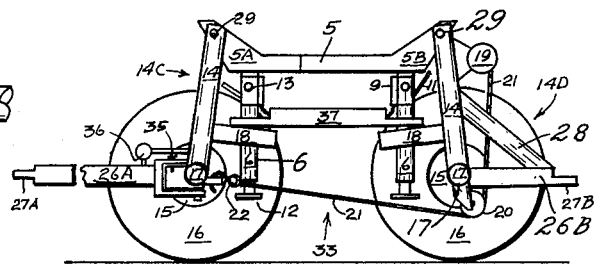
FIG. 4 is a side view of a front unit of this transporting device in position for empty transport and with the empty transport locking bar in place, and wherein the near wheels of the transporting unit are shown removed to show additional details of the transporter.
Figure 5:
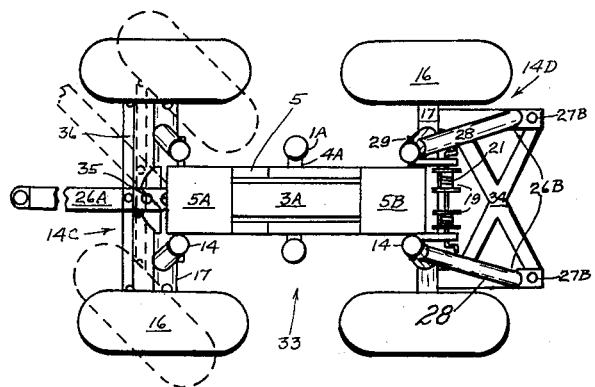
FIG. 5 is a top view of a front unit of this transporting device attached to a wheel of the airplane to be transported, and in the elevated position and ready for transport, and wherein dash lines show typical action of the steering mechanism.

The movement of the transporter units, on their own wheels when unloaded, can be accomplished by installing the empty transport locking bar 37 as shown in FIG. 4. The flexible wheel carriers 7 are contained during such empty transport in the tray formed by the top of said empty transport locking bar.

It is readily apparent that the entire transporter system can be reduced to kit form by separating some of the major components. The removal of the wheels and the winches from the strut assemblies and the removal of the jacks from the carrier frames are the only requirement after the strut assemblies are separated from the carrier assemblies. In this reduced state, the individual transporter tires and wheels should be the heaviest parts.

Further examination will reveal that other combinations of transporter units may be employed to elevate and transport vehicles with more or less than three wheels as shown in FIG. 9. When multiple front units are required, such can be inter-connected with spacer bars between their front towing bars, and supplementary towing cables to the towing vehicle can be employed. In such instances, towing cables from the rear transporter units can be attached to front units in various manners. Similarly, other combinations will permit the use of additional rear transporter units when required.

The fact that single wheels and tires are illustrated in all instances, for both airplanes and transporters, is not intended to indicate that this present invention will not be used to attach to dual airplane wheels and tires also. The possible use of dual wheels and tires on the transporter units is also intended.

It will be further understood that any of the transporter units heretofore described may be power propelled if desired rather than being towed by a separate vehicle. In such cases, the transporter units cannot be reduced to form kits.

While this invention has been shown and described herein with considerable particularity, it will be readily understood by those skilled in the art that other modifications may be resorted to without departing from the spirit of the invention. Reference will therefore be had to the appended claims for a definition of the limits of the invention.

What is claimed is:

1. A transporter system for elevating, supporting and transporting airplanes on the ground, comprising at least one front transporter unit and at least two rear transporter units, each of said transporter units comprising a carrier frame, a first pair of spaced apart struts pivotally connected at their upper ends to one end portion of said frame, a first pair of wheels operatively connected with the lower ends of said struts, a second pair of spaced apart struts pivotally connected at their upper ends to the other end portion of said frame, a second pair of wheels operatively connected with the lower ends of the last named struts, a pair of extensible jacks having the upper ends thereof pivotally connected with said frame, the lower ends of said jacks adapted to be supported by the ground, said jacks being spaced apart a distance sufficient to accommodate an airplane wheel therebetween, means connected with said jacks and having a portion for engaging said airplane wheel to elevate the latter from the ground and for supporting the latter when the jacks are extended, cable means for moving said pairs of wheels toward each other to elevate the frame and jacks and further elevate the supported airplane wheel, and means interconnecting said transporter units for transporting the elevated and supported airplane.

2. A transporter system according to claim 1 which includes a stop carried by each pair of struts for engaging the airplane wheel to limit the movement of said pairs of wheels toward each other.

3. A transporter system according to claim 1 wherein said carrier frame comprises a pair of telescoping members.

4. A transporter system according to claim 1 wherein the means connected with the jacks comprise two separate members, one end of each member being connected with the respective jacks, and means for interconnecting the other ends of the members together.

References Cited in the file of this patent

UNITED STATES PATENTS

| | | |
|---|---|---|
| 2,178,467 | Brent | Oct. 31, 1939 |
| 2,326,684 | Ross | Aug. 10, 1943 |
| 2,357,633 | Cowgill | Sept. 5, 1944 |
| 2,391,503 | Page | Dec. 25, 1945 |
| 2,718,740 | Wallace | Sept. 27, 1955 |

FOREIGN PATENTS

| | | |
|---|---|---|
| 561,744 | Italy | Apr. 27, 1957 |